Jan. 27, 1931.　　　L. J. CHRISTMANN　　　1,790,262
METHOD OF MAKING ESTERS FROM NITRILES
Filed March 30, 1926
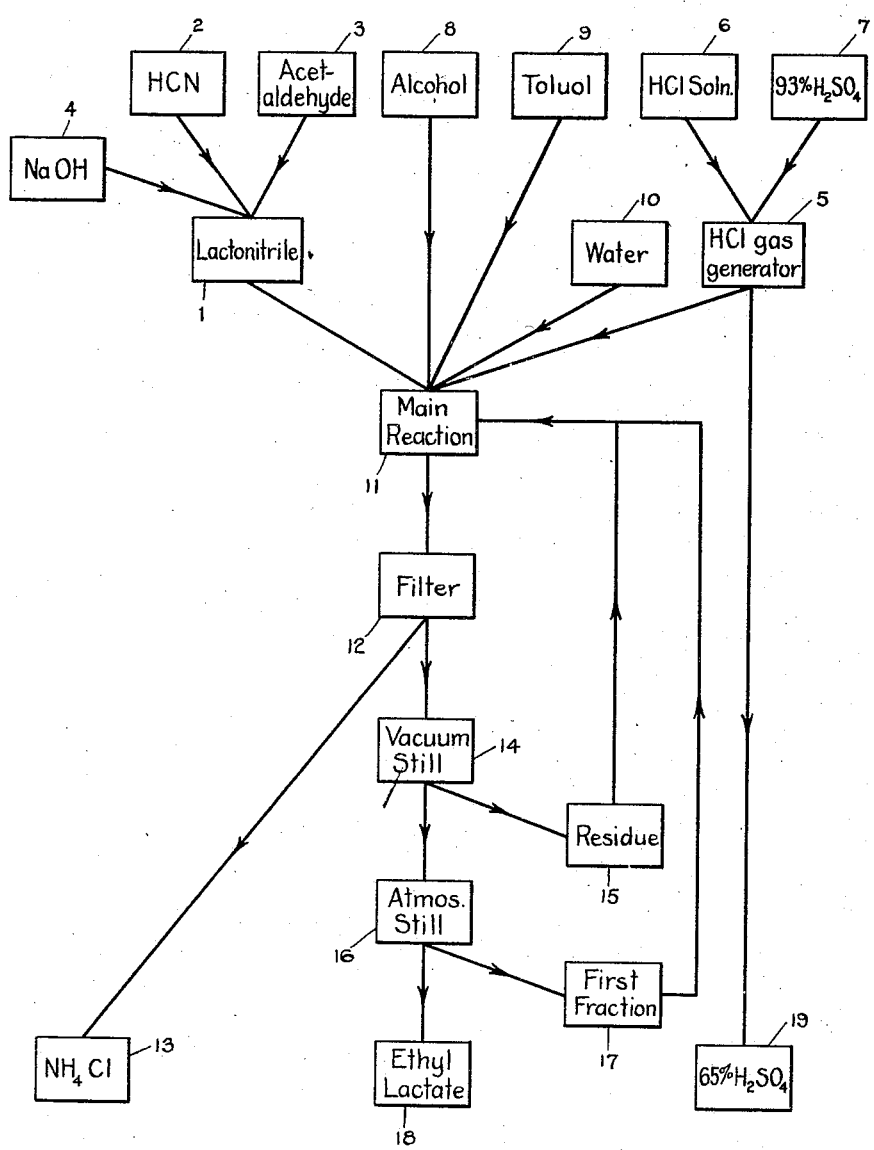
INVENTOR
Ludwig J. Christmann
BY
ATTORNEY Patented Jan. 27, 1931

1,790,262

UNITED STATES PATENT OFFICE

LUDWIG J. CHRISTMANN, OF NEW YORK, N. Y., ASSIGNOR TO AMERICAN CYANAMID COMPANY, OF NEW YORK, N. Y., A CORPORATION OF MAINE

METHOD OF MAKING ESTERS FROM NITRILES

Application filed March 30, 1926. Serial No. 98,408.

This invention relates to the production of esters from nitriles, more particularly to the esters of hydroxy-acids, such as lactic acid.

Various methods for the manufacture of esters of lactic acid, for instance, ethyl lactate, have been proposed. One of such methods consists in providing a mixture of lactonitrile, ethyl alcohol and water, and causing the same to react in the presence of sulphuric acid in accordance with the following equation:

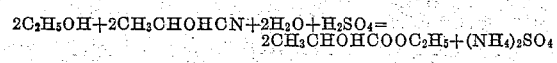

In this process a large excess of alcohol was used, generally about 5 mols per mol of lactonitrile, whereas theoretically the two combine in equal proportions, and the yield of ethyl lactate was rather low, about 30% to 60%.

The present invention is an improvement over the aforesaid method, it being among the objects thereof to provide a method of making esters from nitriles which shall not require the use of a large excess of alcohol and in which the efficiency of conversion to the ester shall be high.

I have found as the result of a long investigation that the efficiency of the above reaction, for instance, may be increased considerably and the cost of production decreased by greatly reducing the amount of the alcohol used and adding to the reaction mixture as a diluent or solvent, a hydrocarbon which does not enter into the reaction. In a series of operations, I add to the succeeding operation the residue from the preceding one and thus further increase the efficiency thereof. I also prefer to use hydrochloric acid as the hydrolyzing medium in the process.

In practicing my invention for the production of ethyl lactate, I utilize a mixture of lactonitrile, ethyl alcohol and sufficient water for the ensuing reaction but I do not provide as large an excess of alcohol, as heretofore. To this mixture is added an organic diluent in which the ingredients are soluble, but which does not enter into the reaction, such as toluol. Hydrochloric acid gas is passed into the mixture until the amount calculated to cause a complete reaction has been absorbed, after which the reaction vessel is heated for several hours. Ammonium chloride, which is formed in the reaction is filtered off and the filtrate is distilled under reduced pressure, the condensate containing the ethyl lactate, which is then separated from the toluol and the excess of alcohol. The yield of ethyl lactate by this process is high, from 75% to 85% of the theoretical and the product is substantially pure. The operation is repeated adding the distillation residue to the reaction mixture whereby the efficiency of the second operation is increased to 90% to 95%.

A specific example of the operation of the invention is as follows:

A reaction vessel is provided with a stirring device and a reflux condenser, and in the same is placed 150 parts of 95% lactonitrile together with 150 parts of 93% ethyl alcohol, 10 parts of water and 100 parts of toluol, all quantities being by weight. Into this mixture is passed 80 parts by weight of hydrochloric acid gas, the amount of gas passed in being determined by any suitable means, such as a flow-meter, or by noting the increase in weight of the reaction vessel, after which the mixture is heated with the reflux and with stirring for about 4 hours, forming ethyl lactate by the following reaction:

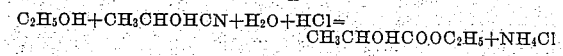

The water necessary for the reaction is derived principally from the water in the ethyl alcohol and the lactonitrile, but part of the water is produced in a side reaction which results in the formation of ether and water from some of the alcohol present. After the completion of the reaction the ammonium chloride formed is filtered off and washed with toluol. The combined filtrate is distilled in a vacuum and the condensate coming over up to 85° C. at 37 mm. pressure is collected. It contains the ethyl lactate, toluol and alcohol, which may be separated by fractional distillation or by other well known means, or the fractional separation may be made during the initial distillation. The efficiency of the reaction is about 85%.

The residue of the vacuum distillation consists principally of lactide and represents a loss, as ordinarily it cannot be converted into lactate during the course of the reaction. However, I have made the unexpected and remarkable discovery that when this residue is added to the reaction mixture it increases the efficiency of conversion to a great degree. For example, I may take the residue resulting from the operation of the above example, and add the same to a similar reaction mixture of 150 parts of 95% lactonitrile, 150 parts of 93% ethyl alcohol, 10 parts of water and 100 parts of toluol, pass in 80 parts of hydrochloric acid gas and conduct the operation as before. In this case the efficiency of the conversion into lactate is about 94%.

This phase of my invention may be used successfully to increase the yield of lactate even when no diluent, such as toluol, is used. I may cause a reaction to take place between 150 parts of 95% lactonitrile, 275 parts of 93% ethyl alcohol and 78 parts of hydrochloric acid gas and obtain a yield of about 69% of ethyl lactate. If a similar run is made with the addition of the distillation residue produced in the previous operation, the yield is increased, and if a series of runs is made, adding to each run the residue from the preceding, the efficiency of the reaction may be gradually increased to about 85%. When a diluent, such as toluol, is used, the initial efficiency is higher, the maximum efficiency is higher and the maximum efficiency is reached with fewer operations.

A modification of the process consists in the use in the reaction mixture of a chloride from which the necessary hydrochloric acid may be generated. In accordance therewith I may place 150 parts of 95% lactonitrile in the reaction vessel and add thereto 150 parts of 93% ethyl alcohol, 250 parts of toluol and 155 parts of calcium chloride. Into this mixture is dropped 140 parts of 96% sulphuric acid at such a rate that the mixture does not heat up to boiling, the mixture being vigorously stirred during the addition of the acid. The stirring is continued for about two hours and the reaction mixture is refluxed in a boiling water bath for about four hours. The precipitate of calcium sulphate and ammonium chloride is filtered off and the filtrate is distilled in a vacuum as described above. By this modification I avoid the necessity of generating gaseous hydrochloric acid in a separate vessel and the yield of ethyl lactate is high, being over 80% of the theoretical. The efficiency of the reaction may be increased as indicated above by returning the residue of the vacuum distillation to the next run.

The accompanying drawing is a diagrammatic view or flow sheet of one mode of operation of my invention.

Lactonitrile 1 is made by slowly adding liquid hydrocyanic acid 2 to acetaldehyde 3 in the cold and in the presence of a small amount of caustic soda 4. Hydrochloric acid gas 5 is generated from a solution of hydrochloric acid 6 and concentrated sulphuric acid 7 by dropping the former onto the latter. Lactonitrile 1, alcohol 8, toluol 9 and water 10 are placed in the main reaction vessel 11, hydrochloric acid gas 5 is led into the same, and the mixture is heated with a reflux for several hours. The product is filtered at 12 and the precipitate of ammonium chloride 13 is removed. The filtrate is distilled in vacuum still 14 and the residue 15 is returned to the vessel 11, the distillate being redistilled in atmospheric still 16, the first fraction 17 is returned to vessel 11, and the remainder of the distillate is ethyl lactate 18 of commerce. The residue 19 from the hydrochloric acid gas generator 5 is a 65% sulphuric acid.

My method is equally well adapted for the preparation of other lactates, for example, methyl lactate. This I have accomplished in the same manner as above with the substitution of methyl alcohol for the ethyl alcohol, using gaseous hydrochloric acid, and also by generating the same in the mixture. Nor is my invention limited to the production of methyl and ethyl lactates as I have successfully operated my process with other alcohols than methyl and ethyl. It is not essential that lactonitrile or even other hydroxy-nitriles be used, as many other nitriles are adaptable to my process, resulting in the production of a series of esters of the corresponding acid. In my description of the operation of the invention I have set forth the use of toluol as a diluent but many other substances, such as benzol, xylol and other hydrocarbons, especially cyclic hydrocarbons, are well adapted to my process. The details of the proportions of the ingredients, and the conditions of the reaction and of the subsequent distillation may be changed in substantial respects without departing from the principles herein set forth. These and other changes may be made in my invention, the scope of which is defined in the claims appended hereto.

What I claim is:

1. A method of making esters from nitriles which comprises providing a mixture of a nitrile and an alcohol in approximately theoretical combining proportions, and treating the mixture with an inorganic acid generated in situ to give substantially complete reaction.

2. A method of making esters from nitriles which comprises providing a mixture of a nitrile and an alcohol in approximately theoretical combining proportions, adding an inert diluent thereto, and treating the mixture with an inorganic acid.

3. A method of making esters from nitriles which comprises providing a mixture of a nitrile and an alcohol in approximately theoretical combining proportions, adding toluol thereto, and treating the mixture with an inorganic acid.

4. A method of making esters from nitriles which comprises providing a mixture of a nitrile and an alcohol in approximately theoretical combining proportions, adding an inert diluent thereto, and treating the mixture with an inorganic acid in a gaseous state.

5. A method of making esters of lactic acid which comprises providing a mixture of lactonitrile and an alcohol in approximately theoretical combining proportions, adding an inert diluent thereto and treating the mixture with hydrochloric acid.

6. A method of making esters from nitriles which comprises providing a mixture of a nitrile and an alcohol in approximately theoretical combining proportions, adding an inert diluent thereto, treating the mixture with an inorganic acid, filtering off the insoluble matter, distilling off the ester, and returning the distillation residue to the reaction.

7. A method of making esters of lactic acid which comprises providing a mixture of lactonitrile and an alcohol in approximately theoretical combining proportions, adding an inert diluent thereto, treating the mixture with hydrochloric acid in the presence of a limited amount of water, heating the reaction mixture, filtering off the precipitate formed, and distilling the filtrate in a vacuum.

8. A method of making esters of lactic acid which comprises providing a mixture of lactonitrile and alcohol in approximately theoretical combining proportions, adding an inert cyclic hydrocarbon solvent thereto, treating the mixture with gaseous hydrochloric acid in the presence of a limited amount of water, heating the reaction mixture, filtering off the precipitate formed, distilling the filtrate in a vacuum, and returning the distillation residue to the reaction.

9. A method of making esters from nitriles which comprises providing a mixture of a nitrile and an alcohol in approximately theoretical combining proportions, and treating the mixture with hydrochloric acid generated in situ by the action of sulphuric acid upon calcium chloride, to give substantially complete reaction.

In testimony whereof, I have hereunto subscribed my name this 24th day of March 1926.

LUDWIG J. CHRISTMANN.